C. SMITH.
RESILIENT WHEEL.
APPLICATION FILED SEPT. 22, 1920.
1,393,324.
Patented Oct. 11, 1921.
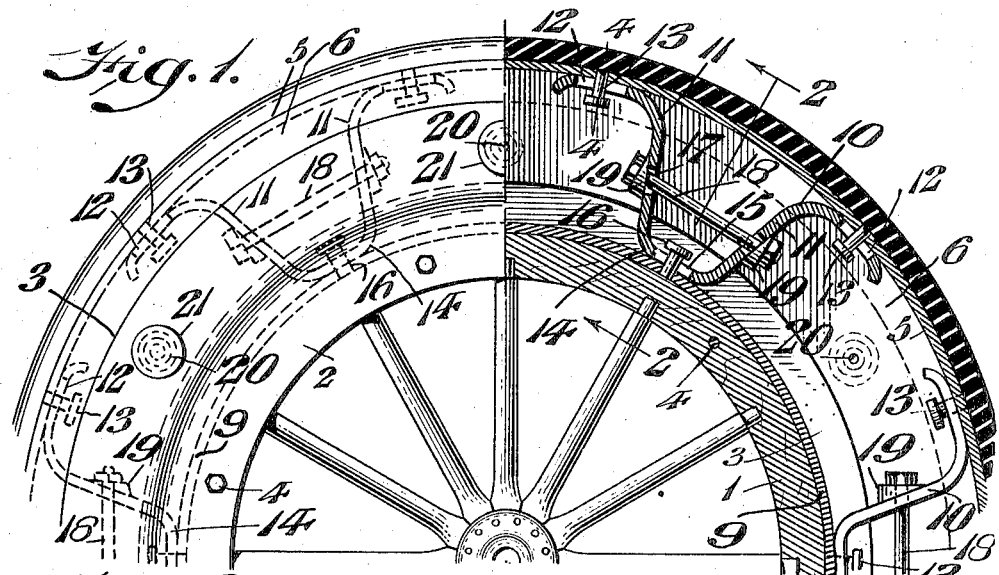
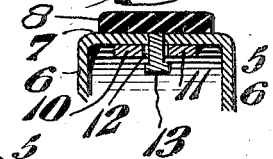
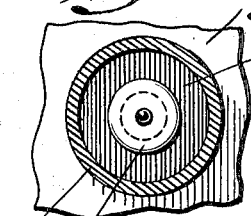
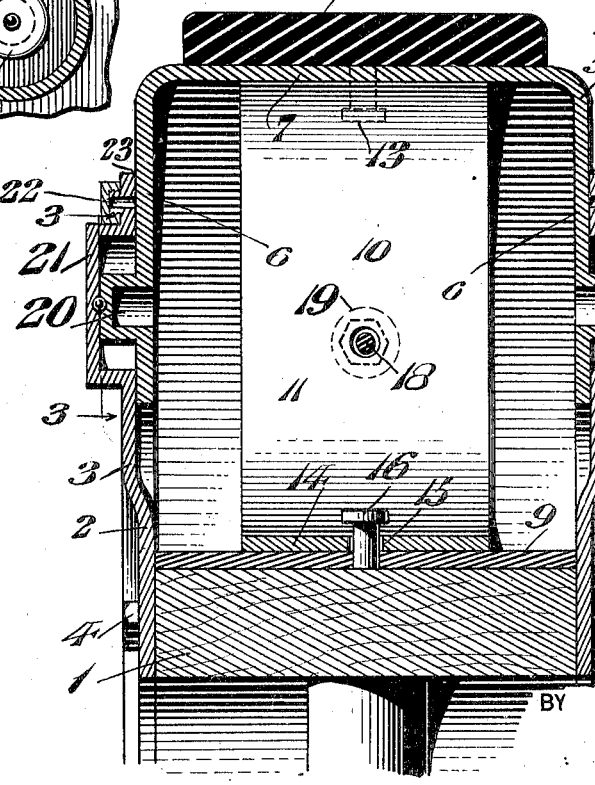
INVENTOR
Clifford Smith
BY
Diedersheim & Fairbank
ATTORNEYS.

UNITED STATES PATENT OFFICE.

CLIFFORD SMITH, OF PHILADELPHIA, PENNSYLVANIA.

RESILIENT WHEEL.

1,393,324.  Specification of Letters Patent.  Patented Oct. 11, 1921.

Application filed September 22, 1920. Serial No. 411,971.

*To all whom it may concern:*

Be it known that I, CLIFFORD SMITH, a citizen of the United States, residing in the city and county of Philadelphia, State of Pennsylvania, have invented a new and useful Resilient Wheel, of which the following is a specification.

My invention consists of a resilient wheel having the tread portion thereof composed of a plurality of concentric rims, one fitted within the other, and interposed resilient members which provide resiliency for the wheel, and novel means for connecting said members whereby they are free to yield to proper extent but prevented from improper spreading.

It consists also of novel devices for connecting said rims and permitting the outer rim to yield resiliently under the conditions of the load to which the wheel is subjected while running, while the inner rim is connected firmly with the felly of the wheel and serves to guide the outer rim on its yielding motions.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a partial side elevation and partial section of a portion of a resilient wheel embodying my invention.

Fig. 2 represents a section of a portion on line 2—2 Fig. 1, on an enlarged scale.

Fig. 3 represents a section of a portion on line 3—3 Fig. 2.

Fig. 4 represents a section of a portion on line 4—4 Fig. 1.

Similar numerals of reference indicate coresponding parts in the figures.

Referring to the drawings, 1 designates the felly of a wheel, and 2 designates a hollow rim of suitable metal of circular form, its sides 3 or side walls being firmly connected with the sides of said felly by the bolts 4, the outer circumference of said rim being open.

5 designates a hollow rim of suitable metal whose sides 6 are fitted freely within the sides 3 of the inner rim, through the open circumference of the latter. Said rim 5 is open on its inner circumference and has its outer circumference closed by the peripheral wall 7 which comprises the tread portion proper of the wheel and has therein around the same the shoe 8 of rubber or other elastic material on which the wheel is adapted to run.

Over the outer periphery of the felly 1 is the ring 9 of metal or other suitable material, the same embracing firmly said felly and extending from the sides 3 of the inner rim 2. Within the spaces of the rims 2 and 5 there are interposed the springs 10 of somewhat U-shape, the terminals of whose limbs are formed with the slots 12 through which pass the headed bolts 13, whose shanks are connected with the inner face of the wall 7 of the outer rim. The crowns 14 of said springs are seated on the ring 9 and formed with the slots 15 through which pass the headed bolts 16 whose shanks are connected with said ring as a connection with the felly by which provision said springs are retained in position and are adapted to yield when the wheel is running, thus providing the resiliency for the wheel.

In order to prevent the limbs 11 from improper spreading while permitting them to yield toward each other they are formed with slots 17 through which are passed freely the shanks of bolts 18 whose ends are provided respectively with heads and nuts, beveled washers 19 being interposed between said heads and nuts and the adjacent portions of the limbs for evident purposes.

On the exterior faces of the sides 6 of the inner rim 5 are the outturned caps or collars 20 at intervals thereon, and on the exterior faces of the sides 3 of the outer rim 2 are the outturned caps or collars 21 at intervals thereon, the caps 21 being of greater diameters than those of the caps 20, said caps forming the means of connection of the rims 5 and 2, but allowing the caps 20 to play in the caps 21, in and out movements as well as in the circular movement of the rim 5, while the wheel is in use said rim 5 yielding radially and circularly to the load thereon subject to the resiliency occasioned by the springs 10.

The outer walls of the collars 20 are in contact freely with the inner walls of the collars 21 so that the former walls ride on the latter walls and so steady the outer rim 5 in its in and out movements on the inner rim 2.

In order to lubricate the sides of the rim 5, there are connected with the terminal portions of the sides 3 of the rim 2 the oil or grease cups 22 whose outlets lead to the joints 23 of the sides of the rims, as shown most plainly in Fig. 2.

Having thus described my invention what I claim as new and desire to secure by Letters Patent, is:—

1. In a resilient wheel, members on the circumference thereof, consisting of inner and outer channel-shaped rims, the outer rim being placed laterally within the inner rim and being movable relatively thereto radially and circumferentially, resilient means interposed between the peripheral wall of the outer rim and the inner rim of the wheel, said resilient means consisting of a spring substantially U-shaped, its limbs being secured to said peripheral wall and its crown being secured to said inner rim, and a bolt-like member adapted to pass freely through slots in said limbs and having its opposite members engaging the outer faces of the latter to prevent spreading thereof.

2. A resilient wheel embodying oppositely-disposed channel-shaped rims one slidable within the other, the one formed on its lateral face with outturned circular caps at intervals of relatively large diameter and the other with outturned smaller circular caps at intervals loosely received within the first-named caps, whereby the rims are guided in their radial movements, and resilient means secured to the opposed surfaces of said channel rims, the caps of the outer rim being adapted to ride on the inner caps to control the outer rim in its movements.

CLIFFORD SMITH.

Witnesses:
JOHN A. WIEDERSHEIM,
N. BUSSINGER.